(12) United States Patent
Frank et al.

(10) Patent No.: US 9,495,817 B2
(45) Date of Patent: *Nov. 15, 2016

(54) ELECTRONIC DELIVERY OF COUNTERFEIT RESISTANT DOCUMENTS DIRECT TO A PURCHASER

(71) Applicant: OnCard Marketing, Inc., New York, NY (US)

(72) Inventors: Leonard Frank, New York, NY (US); Leonard Storch, New York, NY (US)

(73) Assignee: ONCARD MARKETING, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/656,991

(22) Filed: Mar. 13, 2015

(65) Prior Publication Data

US 2015/0187149 A1    Jul. 2, 2015

Related U.S. Application Data

(63) Continuation of application No. 14/099,175, filed on Dec. 6, 2013, now Pat. No. 8,978,977, which is a continuation of application No. 13/477,357, filed on May 22, 2012, now Pat. No. 8,640,951, which is a continuation of application No. 12/429,779, filed on Apr. 24, 2009, now Pat. No. 8,201,735, which is a continuation of application No. 10/971,850, filed on Oct. 22, 2004, now Pat. No. 7,540,415, which is a continuation of application No. 10/728,427, filed on Dec. 4, 2003, now abandoned, which is a continuation of application No. 09/451,207, filed on Nov. 29, 1999, now abandoned.

(51) Int. Cl.
| | |
|---|---|
| G06K 5/00 | (2006.01) |
| G07C 9/00 | (2006.01) |
| G06Q 20/04 | (2012.01) |
| G06Q 20/24 | (2012.01) |
| G06Q 30/02 | (2012.01) |
| G07F 17/42 | (2006.01) |
| G06Q 10/02 | (2012.01) |
| G06Q 20/38 | (2012.01) |

(52) U.S. Cl.
CPC .......... *G07C 9/00103* (2013.01); *G06Q 10/02* (2013.01); *G06Q 20/04* (2013.01); *G06Q 20/045* (2013.01); *G06Q 20/24* (2013.01); *G06Q 20/385* (2013.01); *G06Q 30/02* (2013.01); *G07F 17/42* (2013.01)

(58) Field of Classification Search
USPC ................ 235/382, 380, 381; 705/5, 26, 37
See application file for complete search history.

(56) References Cited

U.S. PATENT DOCUMENTS 8,978,977 B2 *  3/2015  Frank .................... G06Q 20/04
                                                    235/380

* cited by examiner

*Primary Examiner* — Ahshik Kim
(74) *Attorney, Agent, or Firm* — Patent GC LLC

(57) ABSTRACT

Electronic delivery of counterfeit-resistant documents exchangeable for value, such as coupons, gift certificates, vouchers, admission tickets etc., directly to the person who ordered the documents over an open communications network such at the Internet. A first party orders a document from a second party, and the second party electronically delivers the ordered, counterfeit-resistant document to a device designated by the first party. For example, the document may be electronically ordered using a PC, and a printer coupled to the PC may print the document. In one embodiment, the first party transmits unsolicited offers over the open communications network. The document may be made counterfeit resistant by assigning unique information to each document of a given type, e.g., coupons, gift certificates, vouchers, admission tickets etc., and checking the uniqueness of a document and whether the unique information was previously read prior to allowing it to be exchanged for value.

30 Claims, 4 Drawing Sheets

ELECTRONIC DELIVERY OF COUNTERFEIT RESISTANT DOCUMENTS DIRECT TO A PURCHASER

CROSS-REFERENCES TO RELATED APPLICATIONS

This application is a continuation of U.S. application Ser. No. 14/099,175, filed Dec. 6, 2013 (to be issued as U.S. Pat. No. 8,978,977 on Mar. 17, 2015), which is a continuation of U.S. application Ser. No. 13/477,357 filed May 22, 2012 (now U.S. Pat. No. 8,640,951), which is a continuation of U.S. application Ser. No. 12/429,779 filed Apr. 24, 2009 (now U.S. Pat. No. 8,201,735), which is a continuation of U.S. application Ser. No. 10/971,850, filed Oct. 22, 2004 (now U.S. Pat. No. 7,540,425), which is a continuation of U.S. application Ser. No. 10/728,427, filed Dec. 4, 2003, abandoned, which is a continuation of U.S. application Ser. No. 09/451,207, filed Nov. 29, 1999, abandoned, the disclosures of all of which are incorporated herein by reference.

BACKGROUND OF THE INVENTION

The invention disclosed herein relates to electronic delivery of documents exchangeable for value (goods and/or services) such as counterfeit-resistant admission tickets, gift certificates, coupons, vouchers and other documents directly to a location designated by the ordering party over an open network, such as the Internet or the telephone system.

Modern communications and open networks such as the Internet have made the purchase of admission tickets more convenient for individuals. For example, tickets can be ordered via the Internet, or from kiosks, or by telephone (voice or electronically). In response to information provided by the ordering party, the ticketing company provides an admission ticket that is delivered by mail (or a delivery service), or to a kiosk, or provided for pick-up, e.g. at a box office. One drawback in these ticket purchasing procedures is that the purchaser must wait for the tickets to be delivered, or the purchaser must go to a kiosk to order, or the purchaser must pick up the ticket(s) at a designated location. While these order and delivery and pick-up procedures are more or less secure, they are inconvenient to the purchaser. Purchasing gift certificates, which are frequently given during the year-end holiday season, can be a time-consuming and frustrating experience. In the case of coupons and vouchers, it would be convenient to be able to provide these interactively, for example while a PC user is surfing the Web, or through telemarketing, etc.

Applicant is unaware of any system which electronically delivers documents exchangeable for value ordered or accepted by telephone or over the Internet other than as described above. There is a need for a secure and more convenient, counterfeit-resistant document ordering and delivering system, which the invention provides.

OBJECTS AND SUMMARY OF THE INVENTION

It is an object of the invention disclosed herein to provide a secure and convenient way to order and obtain documents exchangeable for value such as admission tickets, gift certificates, coupons, vouchers, etc.

It is another object of the invention to provide such a way which enables an ordering party to order and receive such documents using conventional equipment now present in a typical household such as a PC linked to a communications network such as the telephone system or the Internet, or a telephone, and a printer or fax machine.

The invention achieves the above and other objects in providing a method and system by which a first party orders a document exchangeable for value from a second party, and the second party electronically delivers the ordered document, which is counterfeit resistant, to the first party at a location designated by the first party. "Ordering" is meant in a broad sense herein, and encompasses interactive situations where a document is offered (e.g., an unsolicited offer) by the second party and accepted by the first party. Electronic delivery may take different forms, some of which are described herein.

In a preferred embodiment, electronic delivery comprises the second party providing electronic information to the first party's equipment via the network from which the first party's equipment can produce a hard, counterfeit-resistant copy of the ordered document.

For example, the document may be electronically ordered using a PC, and electronic information defining at least part of the document is provided to the PC, from which equipment coupled to the PC can produce the hard copy of the document. For example, a printer coupled to the PC may print the document. Alternatively, the electronic information may be provided to a fax machine designated by the ordering party. Still further, the document may be ordered by telephone and electronically delivered to a PC or fax machine designated by the ordering party.

The document may be made counterfeit resistant by assigning unique information to each document of a given type, e.g., admission tickets for a given activity or event or date, and checking the uniqueness of a document prior to allowing it to be exchanged for value. Such counterfeit resistant techniques are exemplified by the following U.S. Pat. Nos. 3,833,795; 3,824,544; 4,463,250; and 5,283,422

For example, a unique serial number or other unique alphanumeric information may be assigned to each document of a given type, e.g., admission tickets for a given activity or event, which is printed on the document in machine readable form. The unique information is checkable or evaluatable to determine its uniqueness and thereby to determine whether the document might be counterfeit.

In the preferred embodiment, an ordering party using a PC orders a document exchangeable for value via the Internet from a vendor's Website. The vendor delivers the document electronically to the ordering party's PC (e.g., provides information for printing the ordered document to the PC) from which the ordering party can print the document on paper normally used by the ordering party (or other media). The ticket vendor provides the unique information and in addition, other information. For example, in the case of an admission ticket, such other information may include the venue, the particular activity or event, the date of the activity or event, and if a reserved seat, unique seat information for the activity or event. The unique information and certain other information are delivered to the ordering party's designated location. The document can be printed at the same location at which the information is initially received or the information can be re-transmitted to another location designated by the ordering party for printing.

The unique information may be checked in different ways. In the preferred embodiment, the unique information is stored in a database, and information obtained from the document is checked against the database, and/or information read from documents is stored in a database and the database checked to determine whether the information was previously read from another document. In other embodiments, the uniqueness can be initially read from the document and tested for conformance or compliance using an algorithm, or by comparing the information read from the document to information generated from an algorithm.

The unique information may be information generated according to a detectable series such as alphanumeric serial numbers, or information generated by an algorithm (secret or non-secret), or random information, etc.

"Machine readable" is intended to have a broad meaning, including optical reading (e.g. bar code scanning, OCR, infrared, white light, etc.), magnetic (e.g. magnetic tape, magnetic strip, magnetic disc), transponder (interrogation and response using, rf, for example), rf reflection, tuned rf circuits, electronic (e.g., from a smart card type device, electronic memory), direct contact or otherwise, etc.

Activity and event are used herein in a broad sense and encompass live and pre-recorded performances, sporting games and matches, parks, zoos, fairs, museums, exhibitions, seminars, etc. "Counterfeit-resistant" is meant in a broad sense and includes various ways to authenticate the document based on the document itself, although this may be combined with other techniques such as requiring identification or validation of the document bearer.

In a specific embodiment, a user using a user device orders a document from a supplier's device over the open communications network without any requirement for a prior or existing relationship between the user and the supplier except, if appropriate, a relationship by which the user pays the supplier for the document such as provided by a credit card. Unique information is assigned to the document prior to, during or after ordering thereof. At least information relating to the document and the unique information are electronically transmitted from the at least one supplier's device to a device designated by the user who ordered the document, and the document is printed by a user device with at least the information relating to the document and, in a machine readable form, the unique information.

As mentioned, in the preferred embodiment, the communications network is the Internet, the user device is a PC and the supplier device is a server. However, the user device may comprise a telephone in addition to or in lieu of the PC, and a fax machine in addition to or in lieu of the PC and the printer.

The user PC, printer, telephone and fax machine may be located at the same user site, or they may be located at two or more sites. Also, a user PC may communicate with another device at the user site or at another site which prints or effects printing of the document. Thus, the user PC (user devices) may directly or indirectly effect printing.

With the printing quality provided by low cost ink jet printers, tickets, gift certificates and other documents can be printed using the invention which resemble tickets issued by a venue box office or by mail, and gift certificates purchased at a store or through the mail. In addition, where box office tickets are printed on stiffer stock, a suitable printer may be used to print on such stiffer stock if desired. Thus, tickets, gift certificates and other documents can be printed which resemble documents issued conventionally, and which are counterfeit resistant and can be delivered electronically directly to the person who ordered them.

BRIEF DESCRIPTION OF THE DRAWINGS

The invention is illustrated in the figures of the accompanying drawings which are meant to be exemplary and not limiting, in which like references in the different figures refer to like or corresponding parts, and in which.

DETAILED DESCRIPTION OF THE PREFERRED EMBODIMENTS

The preferred embodiment of the invention is described in connection with admission tickets to activities, events, etc. However, as discussed above, application of the invention is not limited to admission tickets, but also to documents such as gift certificates, coupons, vouchers, etc., and to other documents as will be apparent to others after reading this patent.

Figure 1:
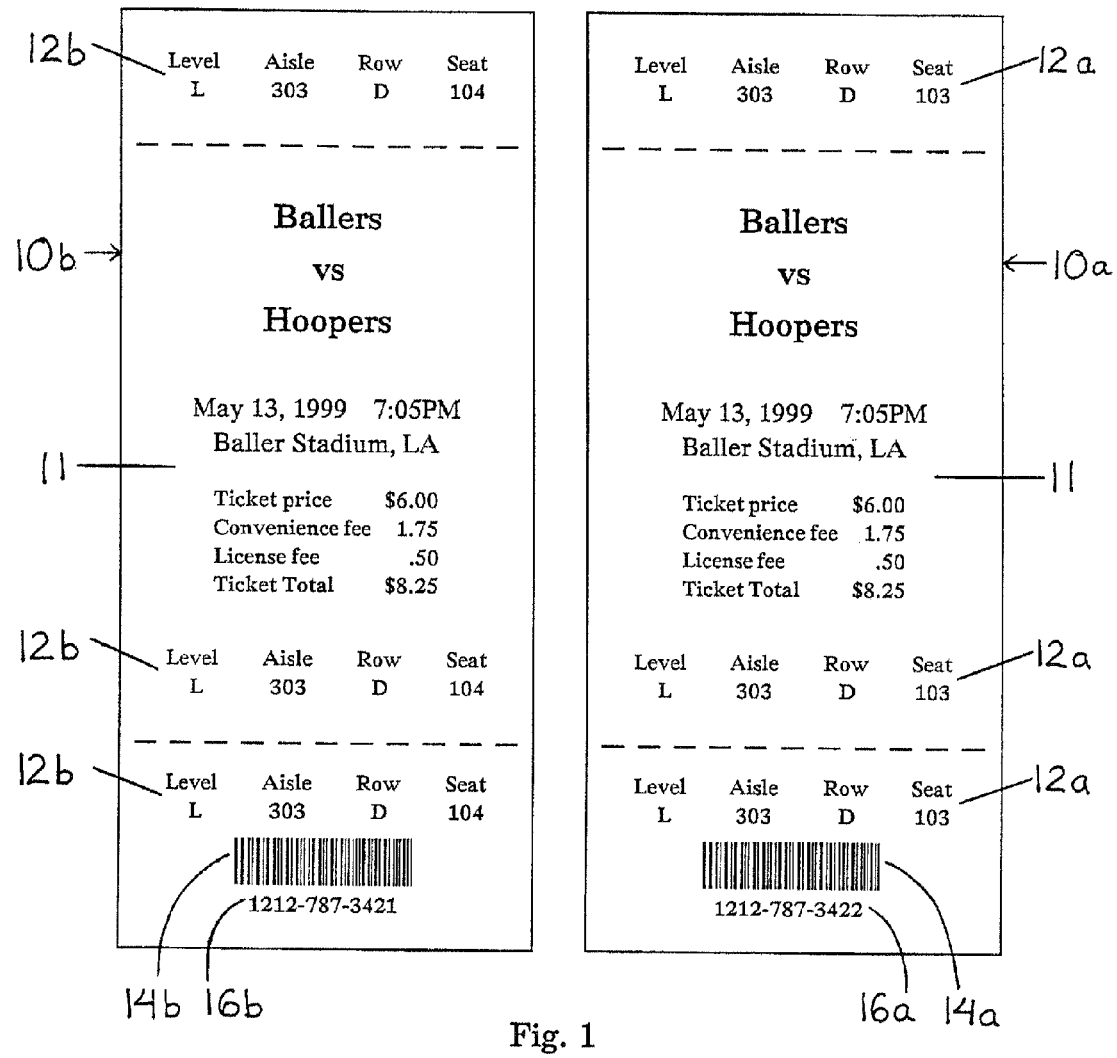
FIG. 1 shows a pair of admission tickets that include unique information printed thereon in a machine readable form, namely a linear bar code.

FIG. 1 depicts two admission tickets 10a and 10b electronically delivered and printed in accordance with invention. Each ticket 10a and 10b may include in human readable form information 11 identifying things like the venue, the event or activity, the date of the event or activity or the date for which admission to the venue is good, and information about the venue or event, etc., and advertising, etc. If the venue and event or activity have seats which are uniquely identified (e.g., by section, level, aisle, row, seat number, etc.), seat information 12a and 12b may also appear on the ticket in human-readable form for convenience in seating the ticket holder in the right seat. Tickets 10a and 10b are similar: ticket 10a is for seat 103 while ticket 10b is for seat 104.

In addition, each ticket 10a and 10b includes unique information 14a and 14b (FIG. 1). The unique information 14a and 14b can be any information, as described above, or can be based on, derived from or include, unique seat information for a particular venue (e.g., section, level, aisle, row and seat number). The information may be generated in any suitable manner, e.g., using an algorithm.

The unique information 14a, 14b may include in whole or part information such as serial numbers, random numbers and numbers generated from known or secret algorithms or the like, check digits, CRC numbers, Reed Solomon, Hamming codes or the like for error control, or any combination thereof. These and other ways may be used to generate the unique information 14a, 14b since how the unique information 14a, 14b is produced or arrived at is not critical. The purpose of the unique information herein to is to uniquely identify each ticket in machine-readable form for security purposes as described below. The unique printed indicia or verification code information 14a, 14b is provided on the ticket in a machine-readable form, as described above. In addition, human readable, i.e., legible, information 16a, 16b corresponding to 14a, 14b respectively may be printed on tickets 10a, 10b, for example, as shown in FIG. 1.

The tickets 10a and 10b are printed on media typically available to a PC user. For example, the tickets 10a and 10b may be printed on ordinary paper typically used for laser jet or ink jet printing in color or black and white. Alternatively, special media may be used, e.g., similar to media now provided for printing checks. The media can be entirely blank, or contain some pre-printing thereon. At least the information 14a, 14b and certain other information is not pre-provided on the media but is provided in accordance with the invention. The tickets 10a and 10b may also include graphics, such as the logo of a sports team, etc.

Figure 2:
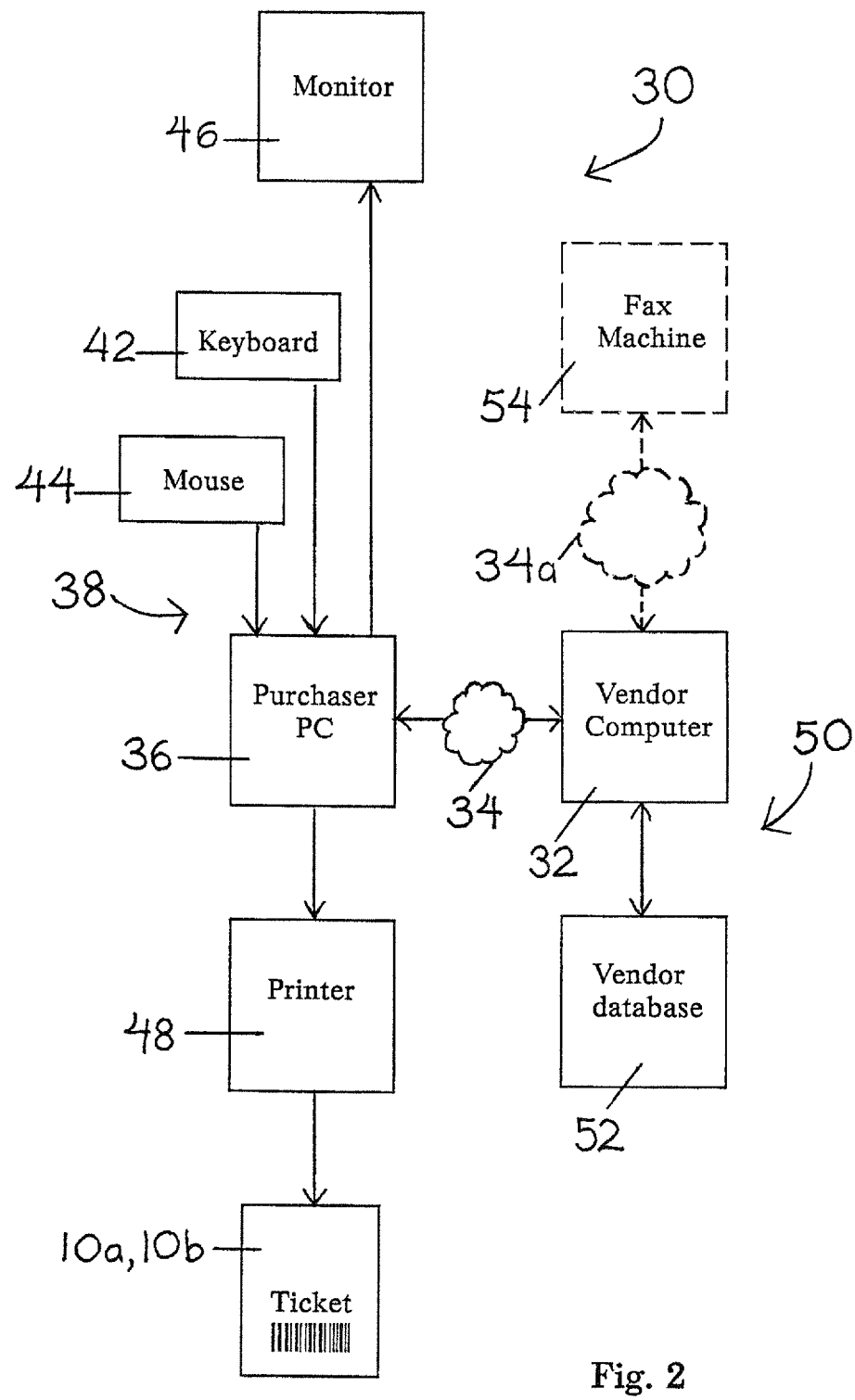
FIG. 2 is a block diagram of embodiments for ordering and delivering a ticket over a computer network according to the invention.

FIG. 2 depicts a system 30 by which a document such as a ticket 10a, 10b can be ordered from a vendor's computer 32 over a communications network 34 using a PC 36 (or network device) which can access the vendor computer 32 over the network 34. In the preferred embodiment, the communications network 34 is the Internet, and the vendor computer 32 is a server that is part of a Website 50 on the World Wide Web. The PC 36 is located at an Internet user site 38, such as a home, office, library, school, lobby, restaurant, etc. The Internet user site 38 includes in addition to (or as part of) the PC 36, a keyboard 42, a mouse 44, a monitor 46, and a printer 48. The user site 38 also includes a connection device (not shown) to the Internet such as a modem, etc. In addition to the ticket vendor computer 32, the ticket vendor Website 50 includes or has access to a database 52 at least for ticket information. The database 52, or another database, may store financial and customer information, as well as other information. Security for preventing unauthorized entry into the database(s) may be provided as known in the art.

In operation, an Internet user accesses a vendor Website 50 using a PC 36 in the usual manner. The user can order a ticket similar to the way that users now order tickets, merchandise or services. The vendor web site 50 may provide a form into which a user inputs information for ordering a ticket. The vendor web site 50 may also provide venue, event and seat selection information to assist a user in placing an order. In the case of uniquely numbered seats (reserved seats), the vendor Website indicates the available seats, or rejects an order for seats already ordered. For example, the PC user may be given limited access to the database to obtain venue, date, seat, etc. information over an open network, while preventing any alteration of the database. The order may be placed over the Internet or via a secure network, e.g., by telephone or fax.

Where payment is required, before, during or after placement of an order, the user provides for payment in accordance with a mode accepted by the vendor, e.g., house account, credit, debit or smart card. The vendor's Website 50 processes the information as is known in the art to obtain authorization for the payment method.

Security for safeguarding a transaction conducted entirely over the Internet is known in the art.

The vendor's Website 50 preferably provides a print preview of a ticket 10a or 10b to the PC 36 to be displayed on the monitor 46 for confirmation of the information (i.e. seat location, date, event, etc.) prior to completing the order. After acceptance by the user of the preview ticket and/or ticket information, the vendor's Website transmits information needed to print a ticket to the user site 38. Prior to the actual printing of the ticket(s) a confirmation number may be provide to the PC 36 for display on the monitor 46 for the user to manually record (or print) for future use. This confirmation number may be useful in the event that a printer failure occurs and the ticket transaction must be voided in the database or reordered. A second attempt may be made for printing a new ticket(s) with the same or different unique information 14a, 14b imprinted thereon. The voided transaction would be recorded e.g., in the database 52, for future reference in the case of fraud by the user.

The vendor's Website 50 may subsequently seek acknowledgment from the user PC 36 that the ticket information was successfully received and/or printed. A delayed or deferred printing option may be selected for downloading ticket information or for printing the ticket(s) at a later time, or for delivery at another designated location. A personal identification number and/or confirmation number may be required before any ticket information can be downloaded. The ticket is delivered as described above. Confirmation may be by voice.

Figure 3:
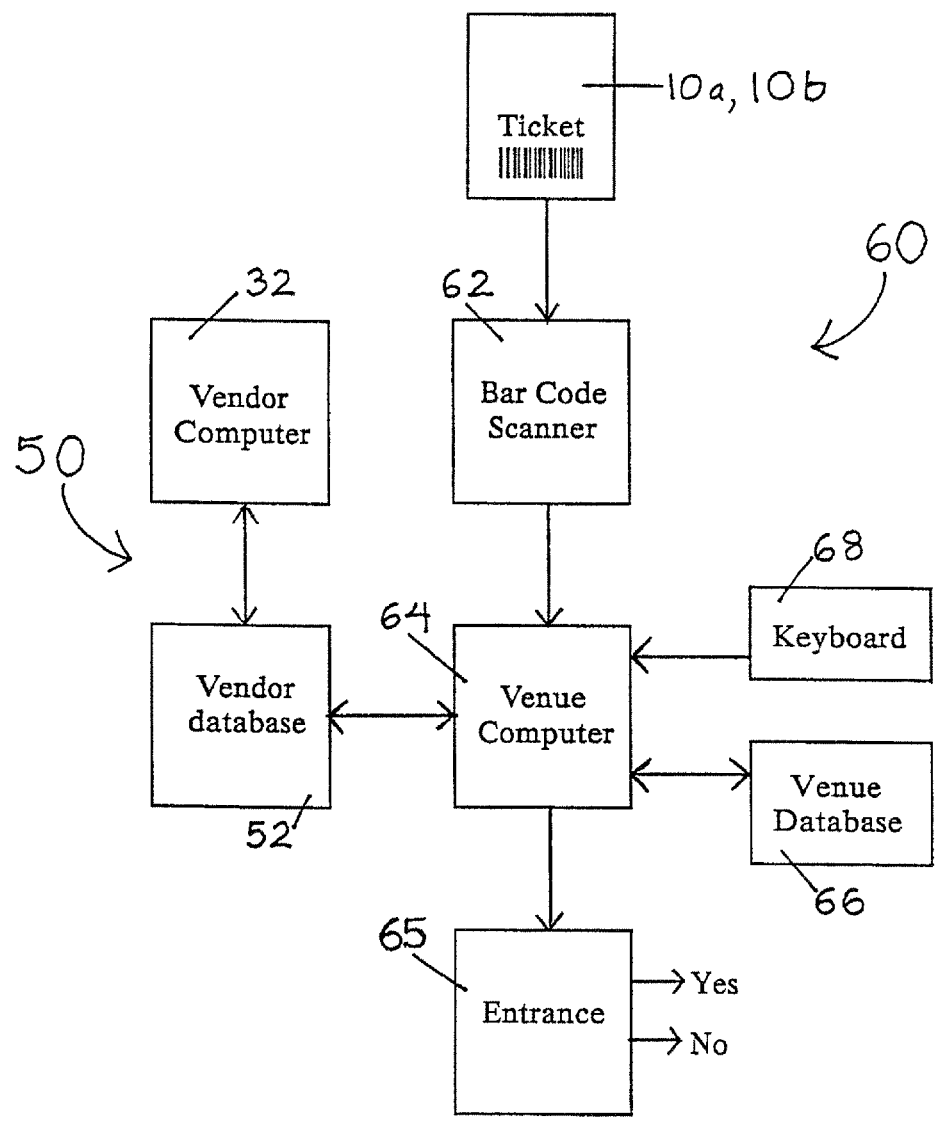
FIG. 3 is a block diagram of one embodiment for verifying an admission ticket at an event according to the invention.

Referring to FIG. 3, a venue admission system 60 includes at least one input device 62 which machine reads the unique information 14a, 14b. The input device 62, such as a bar code scanner, communicates with a venue computer 64 for inputting the data read from the ticket 10a and 10b. This machine-read data is evaluated by the venue computer 64, alone or in cooperation with the vendor database 52 and/or a venue database 66. The venue computer 64 provides for a visual or audible signal at the location of the input device 62 and/or at a gate or entrance 65 by which venue personnel determine whether to allow entry, i.e., the ticket is at this time presumed valid or there is some problem. This verification process takes place in real time so that the verification is substantially instantaneous.

After verification and validation of each ticket, each ticket holder is admitted into the event or activity through entrance 65. After a ticket 10a and 10b has been used for admission to an event or activity, the venue database 66 and/or vendor database 52 are updated to indicate that a ticket 10a or 10b has been presented for admission. The updating of the venue database 66 and/or vendor database 52 of vendor's Website 50 after verification of a ticket will minimize or substantially eliminate unauthorized admission to an event with a copied or duplicated ticket.

If in the event that the ticket becomes damaged or folded thereby rendering it mechanically unreadable, the legible unique printed indicia or verification code 16a, 16b may be manually input by a keyboard 68 into the database, and if accepted, over-ride the mechanical reader and allows entry.

FIG. 3 shows a vendor's Website 50 and a venue admission system 60, and both a vendor computer 32 and a vendor database 52, and a venue computer 64 and a venue database 66. The venue computer and database and the vendor computer and database can be combined. For Internet use, a vendor server can be used in addition to the combined computer.

Security for the system described herein relies on the following: that the unique machine readable bar code information printed on a valid or authorized document must also be stored in a vendor's or venue's authenticating computer database or associated device, associated apparatus or the like, or confirmable or reproducible from an algorithm, etc., so that upon presentation for admission or exchange, the document's bar coded information may be scanned or machine read and the information obtained from that reading is compared via an associated communication apparatus to the stored information obtained from or in the vendor's or venue's database or checked against the algorithm, etc. If a non-match occurs, it indicates a faulty document or faulty reading or that the document is counterfeit. If the information from the reading does match with stored or referenced information, that reading's information may also be checked in the database to determine whether that same reading's information has been read previously from another document, or to determine if that same reading's information is known to be associated with another document somewhere else. In either of these cases, it can be concluded that at least one document has been duplicated without authorization (e.g., is a counterfeit) or through a system error, etc. Subsequent investigation at the venue or elsewhere may be used to determine which document or documents are unauthorized and to take action against the holder of any unauthorized document. Security resides in the fact that two or more documents having the same machine-readable information imprinted thereon means that one or more of them is unauthorized. Minimally, admission for the document holder or completion of the transaction for the suspect document may then be held up while venue or store personnel or authorities investigate.

In an embodiment in which the document is a gift certificate, the certificate is ordered and delivered generally as described above. In addition to the unique information 14a, 14b, information may be provided which gives the value of the certificate and identifies and possibly describes the store. All of the information provided on a gift certificate sold at a store can be provided electronically, so that when printed, the gift certificate closely resembles a store certificate, given the quality of color ink jet printers now available at low cost.

Coupons and vouchers may be ordered and delivered in a similar manner. The ordering may result from an offer of a coupon or voucher that is accepted by a PC user while visiting a Web site, or by a participant in a survey, etc.

Figure 4:
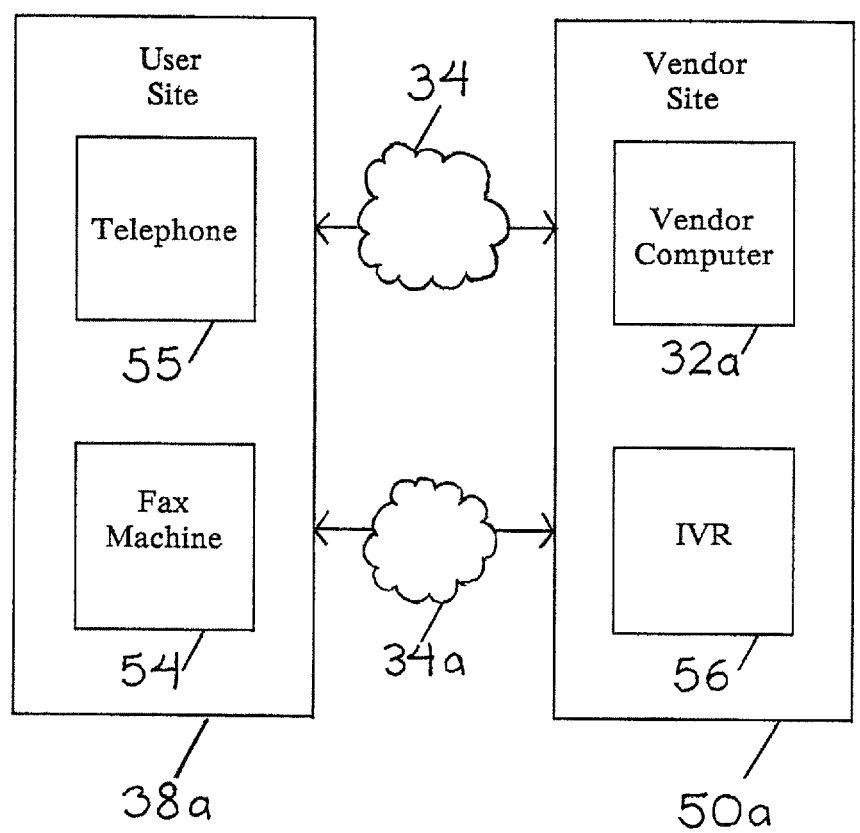
FIG. 4 is a block diagram of an alternate embodiment for ordering and delivery of a document over a communications network in accordance with the invention.

In an alternate embodiment illustrated in broken lines in FIG. 2, a document may be ordered over the Internet using the PC 36 as described above, and delivered by the vendor over the telephone system 34a to a fax machine 54 designated by the user. Ordering of documents over the Internet, and fax delivery of documents is known in the art and therefore will not be described further herein. FIG. 4 illustrates another alternate embodiment in which a document may be ordered by telephone and/or printed on a fax machine. The user site 38a includes a telephone 55 and the fax machine 54, and may or may not include a PC 36 and PC peripherals 42, 44, 46 and 48 (as shown in FIG. 2). The vendor site 50a includes interactive voice response ("IVR") equipment 56 and a vendor computer 32a. A user orders a document using the telephone 55, the voice equipment 56 and the vendor computer 32a. The vendor site 50a delivers the ordered document to the user fax machine 54 or the user PC 36 (if present). Telemarketing including IVR equipment is known in the art and therefore will not be described further herein. The user may also order over the Internet 34 as described above.

While the invention has been described and illustrated in connection with preferred embodiments, many variations and modifications, as will be apparent to those of skill in the art, may be made without departing from the spirit and scope of the invention. The invention as set forth in the appended claims is thus not limited to the precise details of construction set forth above as such variations and modifications are intended to be included within the spirit and scope of the invention as set forth in the defined claims.

The invention claimed is:

1. A computer system by which users of an open communications network can obtain counterfeit resistant documents from a supplier of the documents over the open communications network, and for validating such documents when presented for use, comprising:
   a computer database storing information about counterfeit resistant documents; and
   at least one computer programmed to provide unique information to a document ordered by a user via a user device coupled to the open communications network prior to, during or after ordering of the document by the user and to electronically transmit over the open communications network at least information relating to the document and the unique information to the user device in a form suitable for rendering in a machine readable form, and to store information relating the unique information and the document in the computer database,
   the at least one computer being in communication with a reading device at a location that machine reads the unique information from the document, the at least one computer being further programmed to cause a determination, for the document in real time, using at least the information stored in the computer database and the unique information read by the reading device, of whether the document is valid and has not been previously used, and the at least one computer being further programmed to communicate an indication based on the determination to the location of the reading device.

2. The computer system of claim 1, wherein the at least one computer is further programmed to execute a web server supporting a web site accessible on the open communication network from which the information including the unique information is provided for transmission over the open communication network.

3. The computer system of claim 1, wherein the at least one computer is further programmed to transmit offers over the open communication network for receipt by user devices, each offer being transmitted to one or more of the user devices and being for at least one document, such transmission of the offer by the at least one computer occurring without having received a request for the at least one document from the one or more user devices.

4. The computer system of claim 1, wherein the document is an admission ticket for an event, and wherein the information comprises information relating to at least the event to which the admission ticket provides admission, a date of the event, and a venue for the event.

5. The computer system of claim 1, wherein the document is a coupon.

6. The computer system of claim 1, wherein the machine readable form is a bar code, and the reading device is a bar code scanner.

7. The computer system of claim 1, wherein the machine readable form is interrogation and response using rf.

8. The computer system of claim 1, wherein the machine readable form is electronic.

9. A method, performed by a computer system comprising at least one computer, for providing and verifying counterfeit resistant documents that can be presented for use, the method comprising:
   the computer system receiving a request over an open communications network from a user computer for a document that can be presented for use;
   subsequent to receiving the request, the computer system electronically transmitting the document to a user device, wherein the electronically transmitted document comprises unique information configured to be rendered by the user device in a machine readable form;
   the computer system receiving a communication of the unique information from an input device in response to a machine read of the unique information by the input device in association with a presentation of the document for use;
   the computer system verifying the communicated unique information by determining that the unique information is valid and checking a database to determine that the communicated unique information has not been previously read in association with a presentation for use; and the computer system updating the database to indicate that the unique information has been received in association with a presentation for use.

10. The method of claim 9, wherein the user device is the user computer.

11. The method of claim 9, wherein the user device and the user computer are not co-located.

12. The method of claim 9, wherein the machine readable form is a bar code, and the input device is a bar code scanner.

13. The method of claim 9, wherein the machine readable form is interrogation and response using rf.

14. The method of claim 9, wherein the machine readable form is electronic.

15. The method of claim 9, further comprising the computer system associating the unique information with the document in the database.

16. The method of claim 15, wherein the determining that the unique information is valid is performed by determining whether the unique information has been associated in the database.

17. The method of claim 9, wherein the determining that the unique information is valid is performed by confirming from an algorithm.

18. The method of claim 9, wherein the document is an admission ticket.

19. The method of claim 9, wherein the document is a coupon.

20. A system for providing and verifying counterfeit resistant documents that can be presented for use, the system comprising at least one computer configured for:

receiving a request over an open communications network from a user computer for a document that can be presented for use;

subsequent to receiving the request, electronically transmitting the document to a user device, wherein the electronically transmitted document comprises unique information configured to be rendered by the user device in a machine readable form;

receiving a communication of the unique information from an input device in response to a machine read of the unique information by the input device in association with a presentation of the document for use;

verifying the communicated unique information by determining that the unique information is valid and checking a database to determine that the communicated unique information has not been previously read in association with a presentation for use; and updating the database to indicate that the unique information has been received in association with a presentation for use.

21. The system of claim 20, wherein the user device is the user computer.

22. The system of claim 20, wherein the user device and the user computer are not co-located.

23. The system of claim 20, wherein the machine readable form is a bar code, and the input device is a bar code scanner.

24. The system of claim 20, wherein the machine readable form is interrogation and response using rf.

25. The system of claim 20, wherein the machine readable form is electronic.

26. The system of claim 20, wherein the at least one computer is further configured for associating the unique information with the document in the database.

27. The system of claim 26, wherein the determining that the unique information is valid is performed by determining whether the unique information has been associated in the database.

28. The system of claim 20, wherein the determining that the unique information is valid is performed by confirming from an algorithm.

29. The system of claim 20, wherein the document is an admission ticket.

30. The system of claim 20, wherein the document is a coupon.

* * * * *